US008036102B2

(12) United States Patent
Jain et al.

(10) Patent No.: US 8,036,102 B2
(45) Date of Patent: Oct. 11, 2011

(54) PROTOCOL DEFINITION FOR SOFTWARE BRIDGE FAILOVER

(75) Inventors: Vinit Jain, Austin, TX (US); Jorge Rafael Nogueras, Austin, TX (US); Vasu Vallabhaneni, Austin, TX (US); Patrick Tam Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 12/131,500

(22) Filed: Jun. 2, 2008

(65) Prior Publication Data

US 2008/0225700 A1 Sep. 18, 2008

Related U.S. Application Data

(63) Continuation of application No. 11/227,033, filed on Sep. 15, 2005, now Pat. No. 7,492,704.

(51) Int. Cl.
*H04J 1/16* (2006.01)

(52) U.S. Cl. .................. 370/216; 370/218; 370/221

(58) Field of Classification Search .................. 370/216, 370/218, 221, 217, 220, 222, 223, 224, 225, 370/252, 310, 389, 400, 401, 463, 468, 428, 370/409, 16; 709/203, 201, 217, 242, 228, 709/215, 224, 249, 230; 714/4, 13, 43, 46, 714/48
See application file for complete search history.

(56) References Cited

U.S. PATENT DOCUMENTS

| | | | |
|---|---|---|---|
| 5,548,731 A * | 8/1996 | Chang et al. ............ | 710/100 |
| 5,822,512 A * | 10/1998 | Goodrum et al. ....... | 714/13 |
| 6,148,410 A * | 11/2000 | Baskey et al. .......... | 714/4 |
| 6,173,312 B1 * | 1/2001 | Atarashi et al. ....... | 709/203 |
| 6,408,343 B1 * | 6/2002 | Erickson et al. ....... | 710/15 |
| 6,411,599 B1 * | 6/2002 | Blanc et al. ........... | 370/219 |
| 6,532,535 B1 * | 3/2003 | Maffezzoni et al. .... | 713/1 |
| 2002/0198959 A1 * | 12/2002 | Nishi et al. ............ | 709/217 |
| 2003/0198243 A1 * | 10/2003 | Yamada .................. | 370/428 |
| 2003/0236852 A1 * | 12/2003 | Fernandes et al. ..... | 709/215 |
| 2004/0010583 A1 * | 1/2004 | Yu et al. ................ | 709/224 |
| 2004/0062267 A1 * | 4/2004 | Minami et al. ......... | 370/463 |
| 2004/0153549 A1 * | 8/2004 | Naito et al. ............ | 709/228 |
| 2004/0153714 A1 * | 8/2004 | Kjellberg .............. | 714/4 |
| 2004/0218609 A1 * | 11/2004 | Foster et al. .......... | 370/401 |

(Continued)

OTHER PUBLICATIONS

U.S. Appl. No. 11/002,560, filed Dec. 2, 2004, Brown et al.

(Continued)

*Primary Examiner* — Aung S Moe
*Assistant Examiner* — Abdullah Riyami
(74) *Attorney, Agent, or Firm* — Yee & Associates, P.C.; Matthew W. Baca (57) ABSTRACT

A method, data processing system, and computer usable code are provided for protocol definition for software bridge failover. In a first aspect of the present invention, a first software bridge determines the proper working operation of a physical adapter. Limbo packets are sent to a second software bridge alerting the second software bridge that the first software bridge is no longer bridging traffic responsive to the physical adapter failure in the first software bridge. The second software bridge receives the limbo packets, and, in response to receiving the limbo packets, asserts primary control and initiates bridging of traffic. In an alternative aspect of the present invention a first software bridge sends keep-alive packets. A second software bridge monitors the keep-alive packets from the first software bridge and, in response to a failure to detect the keep-alive packets from the first software bridge, the second software bridge initiates bridging of traffic.

15 Claims, 5 Drawing Sheets

U.S. PATENT DOCUMENTS

| | | | |
|---|---|---|---|
| 2005/0078679 A1* | 4/2005 | Henry et al. | 370/395.2 |
| 2005/0108385 A1* | 5/2005 | Wechter et al. | 709/224 |
| 2005/0138204 A1* | 6/2005 | Iyer et al. | 709/242 |
| 2005/0141499 A1* | 6/2005 | Ma et al. | 370/389 |
| 2005/0262381 A1* | 11/2005 | Ishida | 714/4 |
| 2006/0059287 A1* | 3/2006 | Rivard et al. | 710/300 |
| 2006/0136667 A1* | 6/2006 | Shultz et al. | 711/118 |
| 2006/0200584 A1* | 9/2006 | Bhat | 709/249 |
| 2006/0209892 A1* | 9/2006 | MacMullan et al. | 370/468 |
| 2007/0258359 A1* | 11/2007 | Ogasawara et al. | 370/218 |
| 2008/0215877 A1* | 9/2008 | Brabson et al. | 713/151 |

OTHER PUBLICATIONS

U.S. Appl. No. 11/002,538, filed Dec. 2, 2004, Dea et al.

"Virtual Ethernet for Linux logical partitions", http://publih.boulder.ibm.com/infocenter/eserver/y1r2s/en_US/info/inhat/iphatvirtualethernetlinux.htm retrieved Aug. 23, 2005, p. 1.

* cited by examiner

PROTOCOL DEFINITION FOR SOFTWARE BRIDGE FAILOVER

This application is a continuation of application Ser. No. 11/227,033, filed Sep. 15, 2005, status pending.

BACKGROUND OF THE INVENTION

1. Field of the Invention

The present invention relates generally to software bridge failure. More specifically, the present invention relates to a protocol definition for software bridge failover.

2. Description of the Related Art

Virtual Ethernet technology is supported on systems, such as AIX 5L™ V5.3 on POWER5™ hardware. This technology enables IP-based communication between logical partitions on the same system using a virtual local-area network capable software switch in POWER5™ systems. Shared Ethernet Adapter (SEA) technology enables the logical partitions to communicate with other systems outside the hardware unit without assigning physical Ethernet slots to the logical partitions.

Virtual networking along with other POWER5™ virtualization technologies offers greater flexibility in configuration scenarios. Workloads can be easily consolidated with more control over resource allocation. Network availability can also be improved for more systems with fewer resources using a combination of Virtual Ethernet, Shared Ethernet and link aggregation in the Virtual I/O server. When there are not enough physical slots to allocate a physical network adapter to each logical partition network access using Virtual Ethernet and a Virtual I/O server is preferable to IP forwarding as it does not complicate the IP network topology.

Virtual local-area network is described by the IEEE 802.1Q standard. Virtual local-area network is a method to logically segment a physical network such that layer 2 connectivity is restricted to members that belong to the same virtual local-area network. This separation is achieved by tagging Ethernet packets with their virtual local-area network membership information and then restricting delivery to members of that virtual local-area network.

The virtual local-area network tag information is referred to as virtual local-area network identifier. Ports on a switch are configured as being members of virtual local-area network designated by the virtual local-area network identifier for that port. The default virtual local-area network identifier for a port is referred to as the port virtual local-area network identifier. The virtual local-area network identifier can be added to an Ethernet packet either by a virtual local-area network aware host or by the switch in the case of virtual local-area network unaware hosts.

Therefore, ports on an Ethernet switch have to be configured with information indicating whether the host connected is virtual local-area network aware or unaware. For virtual local-area network unaware hosts, a port is set up as untagged and the switch will tag all packets entering through that port with the port virtual local-area network identifier. It will also untag all packets exiting that port before delivery to the virtual local-area network unaware host. A port used to connect virtual local-area network unaware hosts is called an untagged port, and it can only be a member of a single virtual local-area network identified by its port virtual local-area network identifier.

Hosts that are virtual local-area network aware can insert and remove their own tags and can be members of more than one virtual local-area network. These hosts are typically attached to ports that do not remove the tags before delivering the packets to the host, but will insert the port virtual local-area network identifier tag when an untagged packet enters the port. A port will only allow packets that are untagged or tagged with the tag of one of the virtual local-area networks the port belongs to. These virtual local-area network rules are in addition to the regular media access control address based forwarding rules followed by a switch. Therefore, a packet with a broadcast or multicast destination media access control will also get delivered to member ports that belong to the virtual local-area network that is identified by the tags in the packet. This mechanism ensures the logical separation of physical network based on membership in a virtual local-area network.

As virtual local-area network ensures logical separation at layer 2, it is not possible to have an IP network that spans multiple virtual local-area networks. A router that belongs to both virtual local-area network segments and forwards packets between them is required to communicate between hosts on different virtual local-area network segments. However, a virtual local-area network can extend across multiple switches by ensuring that the virtual local-area network identifiers remain the same and the trunk ports are configured with the appropriate virtual local-area network identifiers. Typically a virtual local-area network capable switch will have a default virtual local-area network defined. The default setting for all its' ports is such that they belong to the default virtual local-area network and, therefore, have a port virtual local-area network identifier and assume that all hosts connecting will be virtual local-area network unaware. This setting makes such a switch equivalent to a simple Ethernet switch that does not support virtual local-area networks.

On AIX 5L™, virtual local-area network tagging and untagging is configured by creating a virtual local-area network device over a physical (or virtual) Ethernet device and assigning it a virtual local-area network tag identifier address, which is then assigned on the resulting interface associated with the virtual local-area network device. AIX 5L™ supports multiple virtual local-area network devices over a single Ethernet device each with its own virtual local-area network identifier. Each of these virtual local-area network devices is an endpoint to access the logically separated physical Ethernet network and the interfaces associated with them are configured with IP addresses belonging to different networks.

In general, configuration is simpler when ports are untagged and only the port virtual local-area network identifier is configured because the attached hosts do not have to be virtual local-area network aware and they do not require any virtual local-area network configuration. However, this scenario has the limitation that a host can access only a single network using a physical adapter. Therefore, untagged ports with port virtual local-area network identifiers only are preferred when accessing a single network per Ethernet adapter and additional virtual local-area network identifiers should be used only when multiple networks are being accessed through a single Ethernet adapter.

Thus, machines that can be logically partitioned into several independent operating system images may need to employ a software bridge to be able to transmit network traffic generated within the logical partitions to the outside world. This software bridge will receive all the traffic generated by the virtual Ethernet network used for inter-logical partition communication and send it out to the outside world through a physical Ethernet adapter. The software bridge resides in a special administrative partition called the hosting partition.

A problem exists when the hosting partition fails for any reason, such as the physical Ethernet adapter in the software bridge fails, or if the network switch that the physical Ethernet adapter is connected to fails. If the hosting partition fails, all internal logical partitions will also lose their connectivity to the outside world.

SUMMARY OF THE INVENTION

The different aspects of the present invention provide a method, data processing system, and computer usable code for protocol definition for software bridge failover. The proper working operation of a physical adapter in a first software bridge is determined. In response to a physical adapter failure in the first software bridge, limbo packets are sent to a second software bridge alerting the second software bridge that the first software bridge is no longer bridging traffic. The second software bridge asserts primary control and initiates bridging of traffic in response to the receipt of the limbo packets.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The aspects of the present invention relate to a protocol definition for software bridge failover. With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Figure 1:
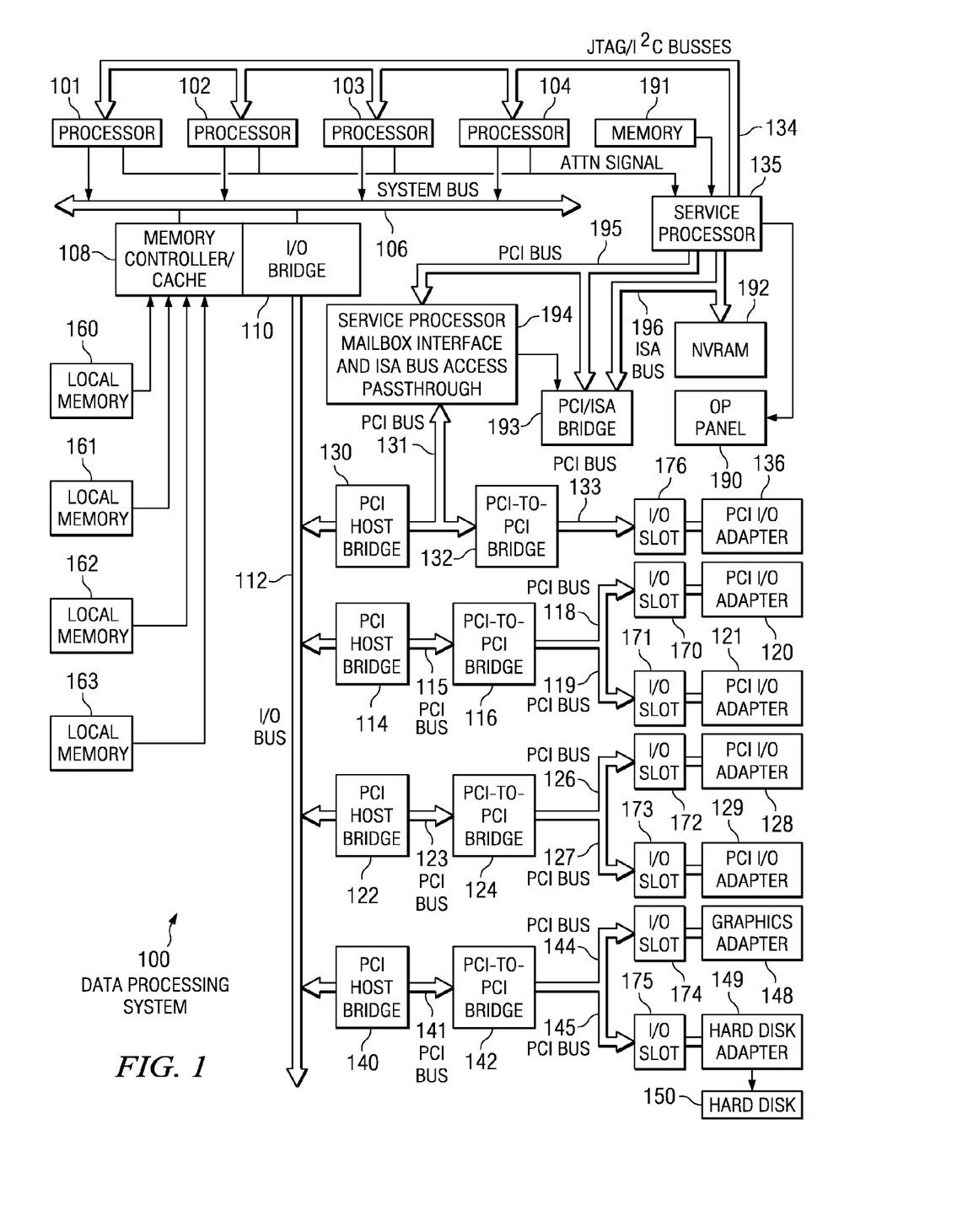
FIG. 1 depicts a pictorial representation of a network of data processing systems in which aspects of the present invention may be implemented.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 connects to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
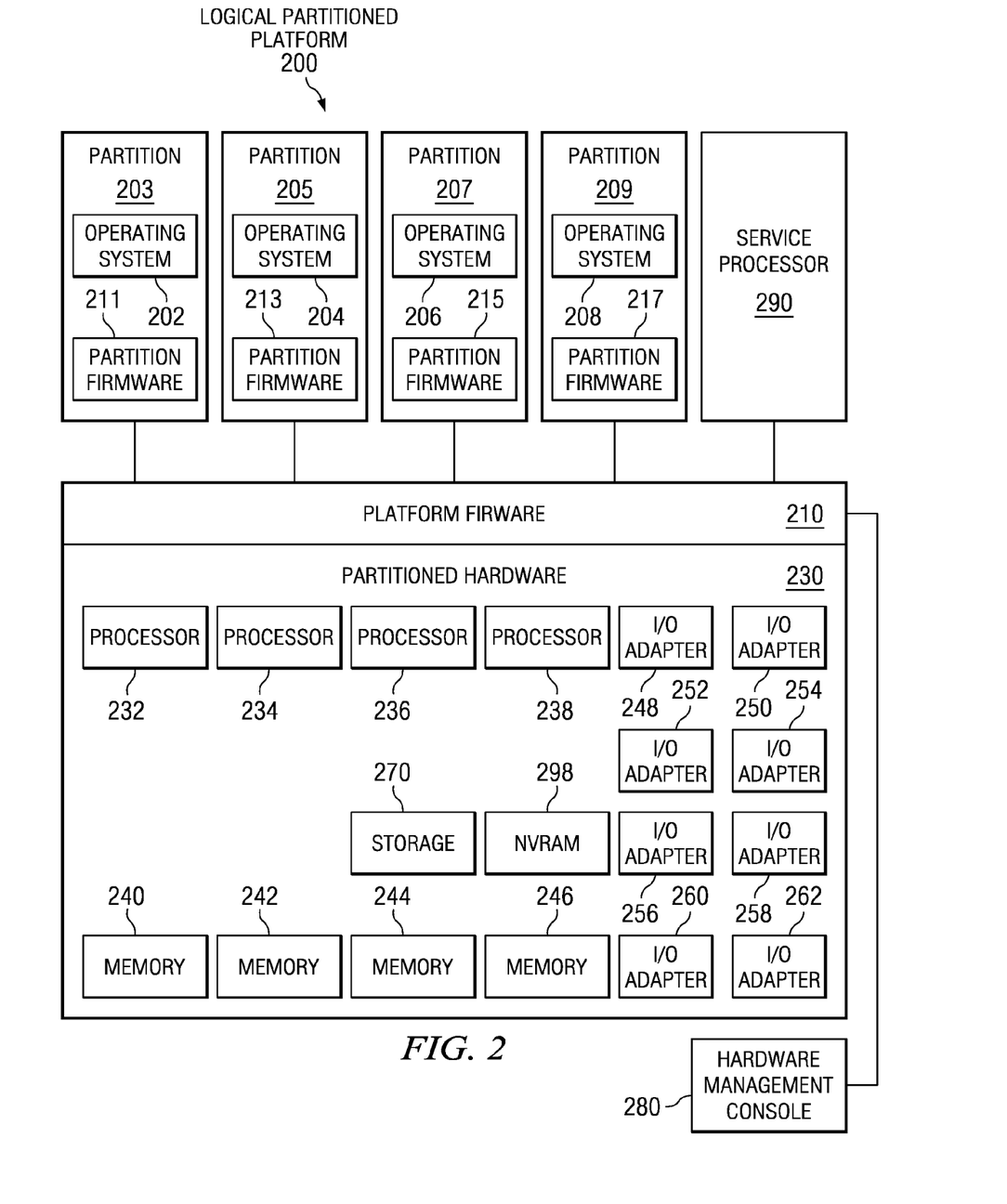
FIG. 2 depicts a block diagram of a data processing system in which aspects of the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
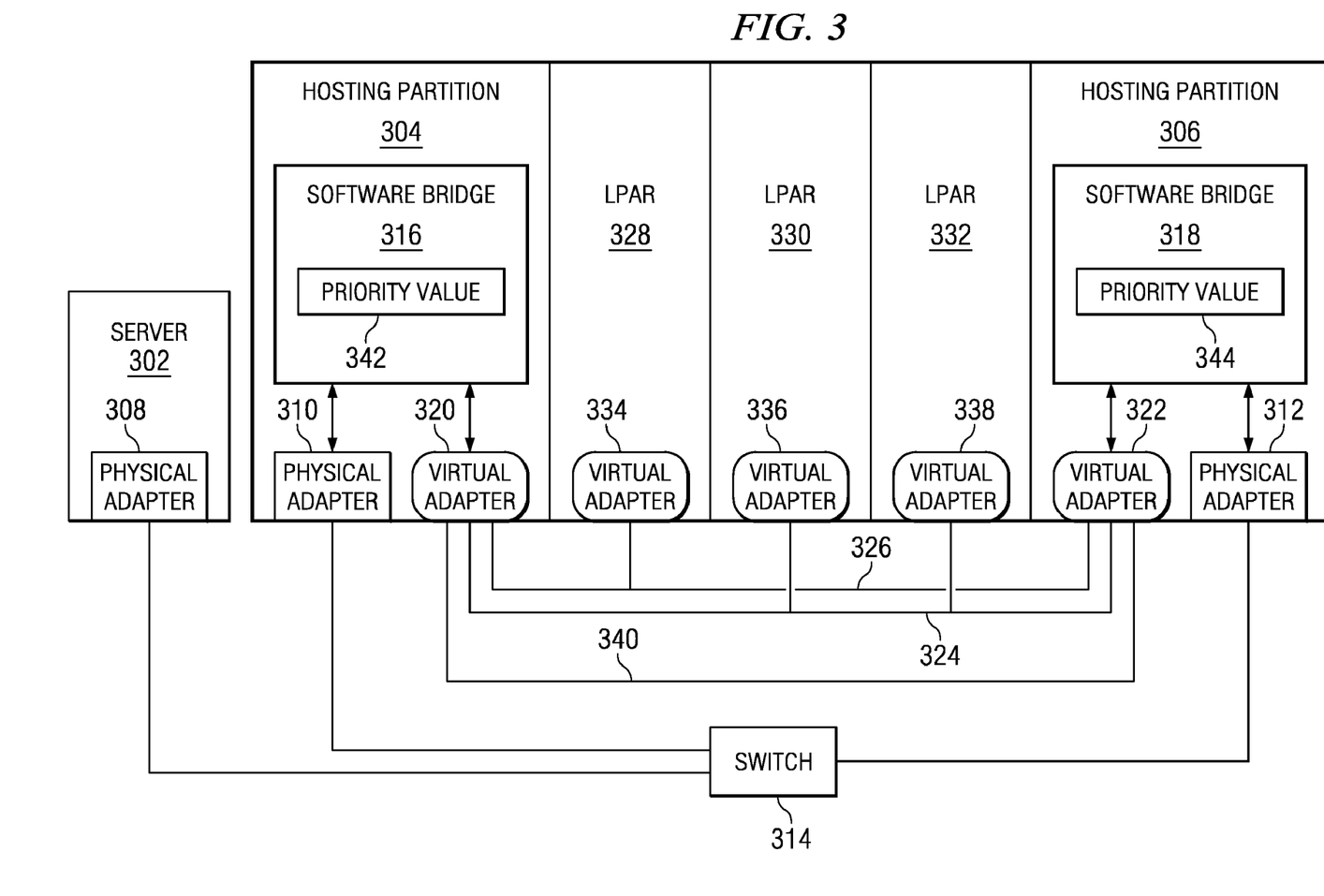
FIG. 3 depicts a functional block diagram of a data processing system with a software bridge failover in accordance with an illustrative embodiment of the present invention.

FIG. 3 depicts a functional block diagram of a data processing system with a software bridge failover in accordance with an illustrative embodiment of the present invention. Server 302 contains physical adapter 308 that is connected to physical adapters 310 and 312 of hosting partitions 304 and 306 through switch 314. In addition to hosting partitions 304 and 306 each containing a physical adapter, physical adapters 310 and 312 respectively, hosting partitions 304 and 306 also each contain a software bridge, software bridges 316 and 318 respectively, and a virtual adapter, virtual adapters 320 and 322 respectively.

Virtual adapters 320 and 322 are connected to each other through one or more virtual connections 324 and 326. However, as shown in FIG. 3, not each of virtual adapters 334, 336, and 338 are connected to each of virtual connections 324 and 326. Thus, while logical partitions 328, 330, and 332 may communicate with hosting partitions 304 and 306, these logical partitions may not be able to directly communicate with each other. Additionally, any communication from virtual adapter 334, 336, and 338 is only bridged by virtual adapter 320 and 322 that has primary control.

In addition to software bridges 316 and 318 being able to communicate with each other through virtual connections 324 and 326, software bridges 316 and 318 also are able to communicate through control channel 340. One exemplary method of communicating over the control channel is via standard Ethernet packets, although any type of packet communication may be employed. As an inventive aspect of the present invention, control channel 340 is a dedicated communication pipe between software bridges 316 and 318. Control channel 340 is used in a failover domain to carry a failover protocol. Control channel 340 has no external traffic and is thus less prone to traffic loss or latency, but it is not assumed that control channel 340 is a loss-less channel. Although control channel 340 is assumed to be loss-less, an exemplary type of loss may be due to a Hypervisor being unable to copy the packet from one hosting partition to another partition.

As another inventive aspect of the present invention is the use of inherent administrator-assigned priority values 342 and 344 that are associated with software bridges 316 and 318. Priority values 342 and 344 are used to determine which of software bridges 316 and 318 in the failover domain should declare primary software bridge status. Priority values 342 and 344 are useful because the administrator is able to decide which of software bridges 316 and 318 are used preferentially as the primary software bridge. The assignment of priorities also enables the assignment of more memory or a faster physical adapter to the primary hosting partition than to the backup hosting partition. Although the assignment of priorities is indicated as a manual assignment by an administrator, assignments may also be dynamically assigned.

The failover protocol that is communicated between software bridges 316 and 318 on communication channel 340 operates in the following manner. Although only two software bridges are shown in the following examples, more than two software bridges could also be supported. As an example, as software bridge 316 initializes, this bridge does not know whether it should behave as the primary or as the backup. So, before software bridge 316 begins to bridge traffic, it listens on control channel 340 for a few seconds to see if a keep-alive packet is received. Keep-alive packets are protocol packets that are sent periodically and continuously on control channel 340 by the current primary software bridge, which is software bridge 318 in this example. The keep-alive packet informs the other software bridge in the failover domain that the primary software bridge is active and that no failover needs to occur. A keep-alive packet contains the priority value of the software bridge that sends the packet. In this example and the following examples, the keep-alive packet includes a keep-alive flag field.

If while initializing, software bridge 316 does not receive any keep-alive packets on control channel 340, software bridge 316 realizes it is the only software bridge in the failover domain, at least as of yet, and asserts itself as the primary software bridge. Software bridge 316 begins to bridge traffic for logical partitions 328, 330, and 332 and begins sending keep-alive packets on control channel 340.

As another example, if software bridge 316 receives a keep-alive packet on control channel 340 with a priority value higher than priority value 342, then software bridge 316 understands that software bridge 318 is the current primary software bridge and asserts a backup status.

As another example, if software bridge 316 receives a keep-alive packet on control channel 340 with a priority value lower than priority value 342, then software bridge 316 understands it should assert itself as the primary software bridge. Software bridge 316 begins sending recovery packets on control channel 340 to let software bridge 318 know that another software bridge with a higher priority will take over the bridging function. In this example and the following examples, the recovery packet is a protocol packet that includes a recovery flag field. Software bridge 318 will respond with a notify packet on control channel 340 to let software bridge 316 know that software bridge 318 has acknowledged the request and will yield to software bridge 316. In this example and the following examples, the notify packet is a protocol packet that includes a notify flag field. At this point, software bridge 316 asserts itself as the primary and begins bridging traffic. Software bridge 318 will then asserts backup status and stops bridging traffic.

As another example, if software bridge 316, now acting as the primary software bridge, notices that physical adapter 310 is no longer working, either because there was an adapter failure or because the switch it was connected to has gone down, software bridge 316 begins sending limbo packets on control channel 340. In determining that physical adapter 310 is no longer working, one exemplary method of determining the status of a network adapter is to asynchronously notify a software bridge of a "link down status" event being detected on the physical adapter. The limbo packets alerts backup software bridge 318 that software bridge 316 is no longer bridging, which causes software bridge 318 to take over as the primary software bridge. In this example and the following examples, the limbo packet is a protocol packet that includes a limbo flag field.

As another example, if software bridge 318 acting as the backup notices it has not received a keep-alive packet on control channel 340 in some predetermined time, or if software bridge 318 receives limbo packets on control channel 340, it knows that the software bridge 316 has gone down and that software bridge 318 must assert itself as the primary software bridge. Although the predetermined time may be a hard-coded or static time interval, the predetermined time may also be any time interval that is set by the software administrator. Software bridge 318 then starts sending keep-alive packets on control channel 340 and begins bridging all traffic.

Figure 4:
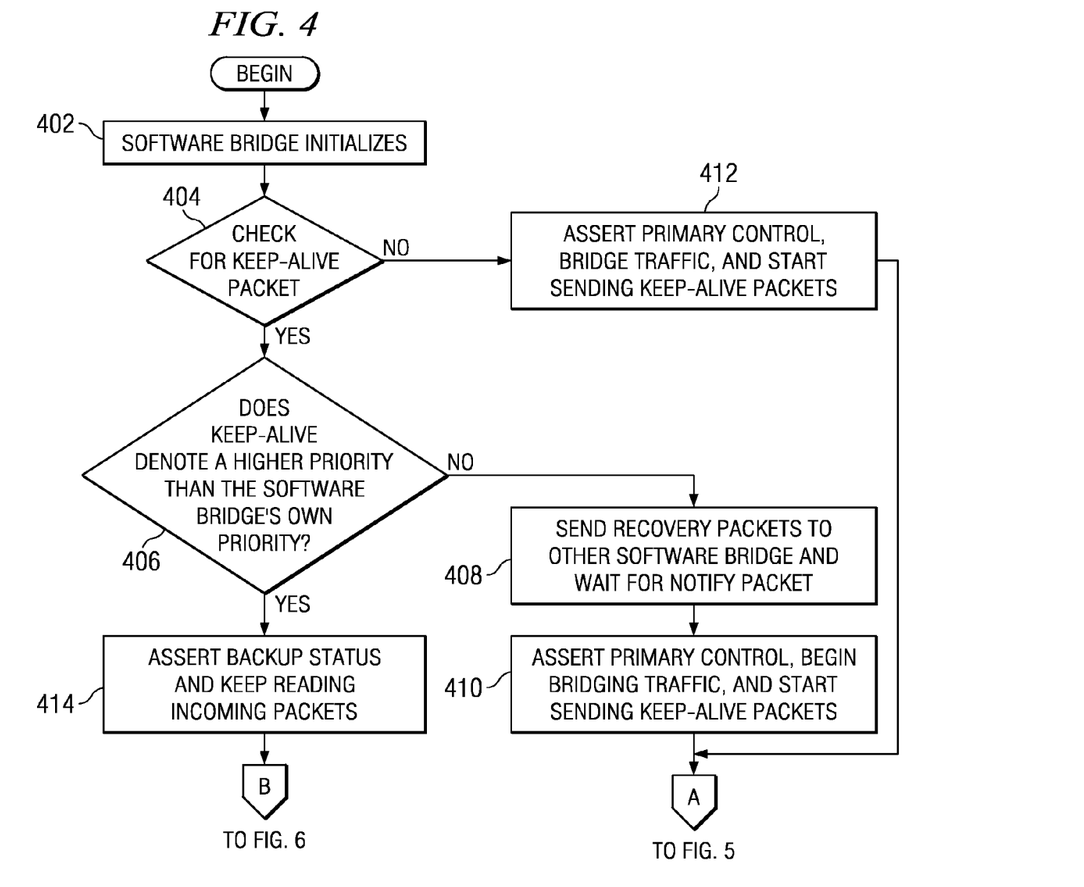
FIG. 4 is a flowchart of a software bridge initialization in accordance with an illustrative embodiment of the present invention.

FIG. 4 is a flowchart of a software bridge initialization in accordance with an illustrative embodiment of the present invention. The software bridge described in the following example may be any software bridges such as software bridges 316 and 318 in FIG. 3. As the operation begins, a data processing system is started and the software bridge is initialized (step 402). Before bridging traffic, the software bridge listens on a control channel for a few seconds for keep-alive packets (step 404). If the software bridge does not receive any keep-alive packets (step 404), the software bridge realizes it is the only software bridge in the failover domain, at least as of yet, and asserts itself as the primary software bridge (step 412). The software bridge begins to bridge traffic for the internal logical partitions and begins sending keep-alive packets on the control channel. The operation then proceeds to a primary control software bridge operation that is described in FIG. 5.

If at step 404, the software bridge receives a keep-alive packet, the software bridge determines if the priority denoted in the keep-alive packet is higher than the assigned priority value of the software bridge (step 406). If the priority value in the keep-alive packet is higher (step 406), then the software bridge asserts a backup status and continues to keep reading incoming packets (step 414). The operation then proceeds to a backup software bridge operation that is described in FIG. 6.

If at step 406, the priority value in the keep-alive packet is a priority lower than the priority value the software bridge is assigned, then the software bridge starts sending recovery packets on the control channel to the current primary software bridge to let the current primary software bridge know another software bridge with a higher priority will take over the bridging function (step 408). The software bridge waits for a notify packet from the current primary software bridge and, once a notify packet is received, the software bridge asserts a primary status, begins bridging traffic, and starts sending keep-alive packets (step 410). The operation then proceeds to a primary control software bridge operation that is described in FIG. 5.

Figure 5:
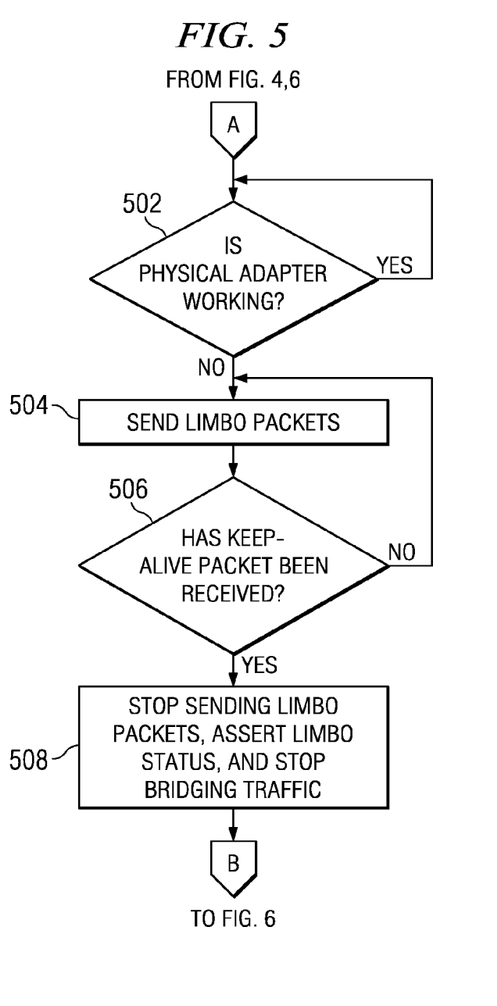
FIG. 5 is a flowchart of a primary software bridge operation in accordance with an illustrative embodiment of the present invention.

FIG. 5 is a flowchart of a primary software bridge operation in accordance with an illustrative embodiment of the present invention. The software bridge described in the following example may be any software bridges such as software bridges 316 and 318 in FIG. 3. As the primary software bridge operation begins, the current primary software bridge continually monitors its associated physical adapter to determine if the physical adapter is working properly (step 502). If the physical adapter is working properly, the operation continues to monitor the physical adapter. If the physical adapter is no longer working, then the current primary software bridge begins sending limbo packets on the control channel (step 504). The limbo packets alert the current backup software bridge that the current primary software bridge is no longer bridging and needs the current backup software bridge to take over as the primary software bridge.

The current backup software bridge responds to the current primary software bridge with keep-alive packets on the control channel to let the current primary software bridge know that another software bridge will take over the bridging function. The current primary software bridge determines if it has received a keep-alive packet (step 506). If the current primary software bridge has not received a keep-alive packet (step 506), the current primary software bridge continues to send limbo packets (step 504). If at step 506, the current primary software bridge receives a keep-alive packet, then the current primary software bridge stops sending out limbo packets, asserts a limbo status, and stops bridging traffic (step 508).

Figure 6:
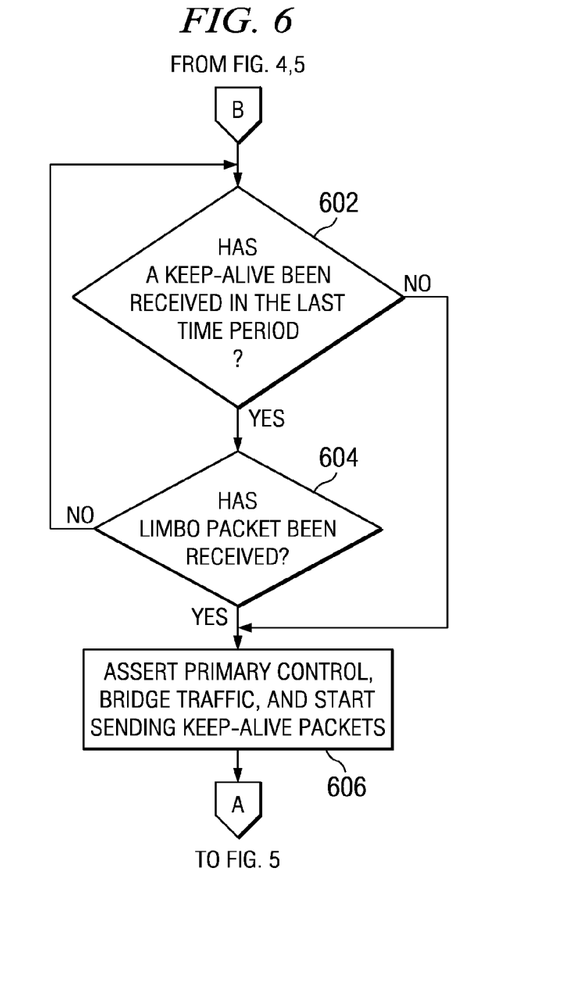
FIG. 6 is a flowchart of a backup software bridge operation in accordance with an illustrative embodiment of the present invention.

FIG. 6 is a flowchart of a backup software bridge operation in accordance with an illustrative embodiment of the present invention. The software bridge described in the following example may be any software bridges such as software bridges 316 and 318 in FIG. 3. As the backup software bridge operation begins, the current backup software bridge monitors the control channel for keep-alive packets (step 602). If the current backup software bridge determines that it has not received a keep-alive packet in some predetermined time (step 602), the current backup software bridge realizes the current primary software bridge has gone down, asserts primary control, bridges traffic, and starts sending keep-alive packets (step 610).

If at step 602 the current backup software bridge is receiving keep-alive packets, then a determination is made as to whether the current backup software bridge receives limbo packets from the current primary software bridge (step 604). If at step 604, the current backup software bridge receives limbo packets, the current backup software bridge asserts primary control, begins bridging traffic, and starts sending out keep-alive packets. If the current backup software bridge has not received limbo packets then the current backup software bridge continues to monitor the control channel at step 602.

The aspects of the present invention provide for a protocol definition for software bridge failover. The proper working operation of a physical adapter in a first software bridge is determined. In response to the physical adapter failure in the first software bridge, limbo packets are sent to a second software bridge alerting the second software bridge that the first software bridge is no longer bridging traffic. The second software bridge asserts primary control and initiates bridging of traffic in response to the receipt of the limbo packets.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be (1) a computer readable storage medium including an electronic, magnetic, optical, electromagnetic, infrared, or semiconductor system (or apparatus or device) or (2) a propagation medium. Examples of a computer-readable storage medium include a semiconductor or solid state memory, magnetic tape, a removable computer diskette, a random access memory (RAM), a read-only memory (ROM), a rigid magnetic disk and an optical disk.

Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing software bridge failover in a logical partition data processing system having a plurality of logical partitions that each have an operating system running therein, the computer implemented method comprising steps performed by a computer of:
    sending keep-alive packets onto a virtual network by a first software bridge using a given virtual adapter associated with a given partition of the plurality of logical partitions, wherein the keep-alive packet informs a second software bridge that the first software bridge is active and that failover is not necessary;
    monitoring for the keep-alive packets on the virtual network by the second software bridge using another given virtual adapter associated with another given partition;
    monitoring, by the computer, for a failure in the first software bridge executing in the given partition of the plurality of logical partitions; and
    responsive to detecting the failure in the first software bridge, initiating bridging of traffic by the second software bridge in place of the first software bridge, wherein the second software bridge is executing in the another given partition of the plurality of logical partitions, wherein initiating bridging of traffic by the second software bridge is initiated by:
        sending a limbo packet to the second software bridge alerting the second software bridge that the first software bridge is no longer bridging traffic;
        receiving at the second software bridge the limbo packet; and
        responsive to receiving the limbo packet at the second software bridge, initiating bridging of traffic by a second software bridge in the logical partition data processing system in place of the first software bridge in the logical partition data processing system;
    wherein the first software bridge and the second software bridge are both operable for providing a communication path from each of the plurality of logical partitions to a respective physical network adapter associated with the first software bridge and second software bridge, respectively, and wherein the failure in the first software bridge is a failure of a network physical adapter physically attached to the logical partition data processing system and associated with the given partition, wherein the given partition comprises a given virtual adapter, and wherein the another given partition comprises another given virtual adapter and another network physical adapter physically attached to the logical partition data processing system that are both used by the second software bridge, and wherein the first software bridge and the second software bridge communicate with each other within the logical partition data processing system using the given virtual adapter and the another given virtual adapter.

2. The computer implemented method of claim 1, wherein both the given partition and the another given partition are included in the logical partition data processing system.

3. The computer implemented method of claim 1, further comprising:
    responsive to a failure to detect the keep-alive packets from the first software bridge, initiating bridging of traffic by the second software bridge, wherein each of the first and second software bridges are operable for receiving traffic generated by the plurality of logical partitions and sending it to a respective physical network adapter.

4. The computer implemented method of claim 1, wherein the keep-alive packets are protocol packets that are sent periodically and continuously on a control channel.

5. The computer implemented method of claim 1, wherein the keep-alive packet contains a priority value of the first software bridge.

6. The computer implemented method of claim 1, further comprising:
    initializing, by the computer, the first software bridge;
    monitoring for keep-alive packets on a control channel that operably connects the first software bridge to the second software bridge;
    responsive to the failure to receive the keep-alive packets, asserting primary control by the first software bridge; and
    initiating bridging of traffic onto a virtual network by the first software bridge, wherein each of the first and second software bridges are operable for receiving traffic generated by the plurality of logical partitions and sending the traffic to a respective physical network adapter.

7. The computer implemented method of claim 6, further comprising:
    responsive to receiving the keep-alive packets, determining if the keep-alive packet contains a priority value higher than a priority value associated with the first software bridge;
    responsive to a higher priority value, asserting backup status by the first software bridge; and
    monitoring the control channel by the first software bridge.

8. The computer implemented method of claim 6, further comprising:
    responsive to receiving the keep-alive packets, determining if the keep-alive packet contains a priority value higher than a priority value associated with the first software bridge;
    responsive to a lower priority value, asserting primary control by the first software bridge; and initiating bridging of traffic by the first software bridge.

9. The computer implemented method of claim 1, further comprising:
monitoring for a failure in the second software bridge; and
responsive detecting the failure in the second software bridge, initiating bridging of traffic by a third software bridge in place of the second software bridge.

10. A multi-partitioned data processing system comprising:
a central processing unit and memory coupled to a bus;
a plurality of partitions each having an operating system running therein;
a first software bridge executing in one partition of the plurality of partitions; and
a second software bridge executing in another partition of the plurality of partitions, wherein the first software bridge executes a set of instructions to monitor for a failure in the first software bridge and the second software bridge executes a set of instructions to initiate bridging of traffic for the plurality of partitions in place of the first software bridge responsive detecting the failure in the first software bridge, and wherein the first software bridge and the second software bridge communicate with each other using a first virtual adapter associated with the one partition and a second virtual adapter associated with the another partition, wherein the instructions executed by the second software bridge to initiate bridging of traffic by the second software bridge is initiated by the first software bridge executing a set of instructions to send a limbo packet to the second software bridge alerting the second software bridge that the first software bridge is no longer bridging traffic; the second software bridge executing a set of instructions to receive at the second software bridge the limbo packet; the second software bridge executing a set of instructions to initiating bridging of traffic by the second software bridge in place of the first software bridge in response to receiving the limbo packet at the second software bridge; the first software bridge executing a set of instructions to send keep-alive packets onto a virtual network by the first software bridge using a given virtual adapter associated with the one partition, wherein the keep-alive packet informs the second software bridge that the first software bridge is active and that failover is not necessary; the second software bridge executing a set of instructions to monitor for the keep-alive packets on the virtual network by the second software bridge using another given virtual adapter associated with the another partition, wherein each of the first and second software bridges are operable for receiving traffic generated by the plurality of partitions and sending it to a respective physical network adapter, wherein the first software bridge and the second software bridge are both operable for providing a communication path from each of the plurality of partitions to a respective physical network adapter associated with the first software bridge and second software bridge, respectively, and wherein the failure in the first software bridge is a failure of a network physical adapter physically attached to the logical partition data processing system and associated with the given partition, wherein the given partition comprises a given virtual adapter, and wherein the another given partition comprises another given virtual adapter and another network physical adapter physically attached to the logical partition data processing system that are both used by the second software bridge, and wherein the first software bridge and the second software bridge communicate with each other within the logical partition data processing system using the given virtual adapter and the another given virtual adapter.

11. The data processing system of claim 10, wherein the second software bridge executing a set of instructions to initiate bridging of traffic by the second software bridge in response to a failure to detect the keep-alive packets from the first software bridge, wherein each of the first and second software bridges are operable for receiving traffic generated by the plurality of partitions and sending it to a respective physical network adapter.

12. The data processing system of claim 10, wherein the first software bridge executing a set of instructions to initialize the first software bridge; monitor for keep-alive packets on a control channel that operably connects the first software bridge to the second software bridge; assert primary control by the first software bridge responsive to the failure to receive the keep-alive packets; and initiate bridging of traffic onto a virtual network by the first software bridge, wherein each of the first and second software bridges are operable for receiving traffic generated by the plurality of partitions and sending the traffic to a respective physical network adapter.

13. A computer program product comprising:
a non-transitory computer readable medium including computer usable program code stored thereon for providing software bridge failover in a logical partition data processing system having a plurality of logical partitions that each have an operating system running therein, the computer program product including:
computer usable program code for sending keep-alive packets onto a virtual network by a first software bridge using a given virtual adapter associated with a given partition of the plurality of logical partitions, wherein the keep-alive packet informs a second software bridge that the first software bridge is active and that failover is not necessary;
computer usable program code for monitoring for the keep-alive packets on the virtual network by the second software bridge using another given virtual adapter associated with another given partition;
computer usable program code for monitoring for a failure in the first software bridge executing in the given partition of the plurality of logical partitions; and computer usable program code for initiating bridging of traffic by the second software bridge in place of the first software bridge in response to detecting the failure in the first software bridge, wherein the second software bridge is executing in the another given partition of the plurality of logical partitions,
and wherein the first software bridge and the second software bridge communicate with each other using a first virtual adapter associated with the given partition and a second virtual adapter associated with the another given partition, wherein the first software bridge and the second software bridge are both operable for providing a communication path from each of the plurality of logical partitions to a respective physical network adapter associated with the first software bridge and second software bridge, respectively, wherein the computer usable program code for initiating bridging of traffic by the second software bridge is initiated by:
computer usable program code for sending a limbo packet to the second software bridge alerting the second software bridge that the first software bridge is no longer bridging traffic;
computer usable program code for receiving at the second software bridge the limbo packet; and computer usable program code for initiating bridging of traffic by a second software bridge in place of the first software bridge in response to receiving the limbo packet at the second software bridge;

wherein the failure in the first software bridge is a failure of a network physical adapter physically attached to the logical partition data processing system and associated with the given partition, wherein the given partition comprises a given virtual adapter, and wherein the another given partition comprises another given virtual adapter and another network physical adapter physically attached to the logical partition data processing system that are both used by the second software bridge, and wherein the first software bridge and the second software bridge communicate with each other within the logical partition data processing system using the given virtual adapter and the another given virtual adapter.

14. The computer program product of claim 13, further comprising:

computer usable program code for initiating bridging of traffic by the second software bridge in response to a failure to detect the keep-alive packets from the first software bridge, wherein each of the first and second software bridges are operable for receiving traffic generated by the plurality of logical partitions and sending it to a respective physical network adapter.

15. The computer program product of claim 13, further comprising:

computer usable program code for initializing the first software bridge;

computer usable program code for monitoring for keep-alive packets on a control channel that operably connects the first software bridge to the second software bridge;

computer usable program code for asserting primary control by the first software bridge in response to the failure to receive the keep-alive packets; and computer usable program code for initiating bridging of traffic onto a virtual network by the first software bridge, wherein each of the first and second software bridges are operable for receiving traffic generated by the plurality of logical partitions and sending the traffic to a respective physical network adapter.

* * * * *